United States Patent
Forsythe, Jr. et al.

(10) Patent No.: US 6,434,494 B1
(45) Date of Patent: Aug. 13, 2002

(54) PRESSURE BASED FLUID GAUGING SYSTEM

(75) Inventors: Arthur M. Forsythe, Jr., Shelbourne; Lisa Brackenbury Maurice, Jericho, both of VT (US)

(73) Assignee: Simmonds Precision Products, Inc., Charlotte, NC (US)

( * ) Notice: Subject to any disclaimer, the term of this patent is extended or adjusted under 35 U.S.C. 154(b) by 0 days.

(21) Appl. No.: 09/280,525

(22) Filed: Mar. 30, 1999

(51) Int. Cl.[7] .............................................. G01F 23/00
(52) U.S. Cl. ........................ 702/50; 702/55; 702/156; 73/861.56
(58) Field of Search .............................. 702/47, 50, 55, 702/138, 155, 156, 23–25; 73/314, 861.42, 861.46

(56) References Cited

U.S. PATENT DOCUMENTS

| | | | |
|---|---|---|---|
| 4,553,216 A | * 11/1985 | Stevens et al. | 702/55 |
| 4,586,383 A | * 5/1986 | Blomquist | 73/706 |
| 5,138,559 A | * 8/1992 | Kuehl et al. | 702/55 |
| 5,723,870 A | * 3/1998 | Crowne et al. | 340/870.16 |
| 5,799,114 A | * 8/1998 | Dowling | 708/403 |

* cited by examiner

Primary Examiner—John S. Hilten
Assistant Examiner—Bryan Bui
(74) Attorney, Agent, or Firm—James M. Rashid; Calfee, Halter & Griswold LLP

(57) ABSTRACT

A method for gauging liquid in a container, the method comprising: a) assigning a local three axis coordinate system for the container; b) dividing the container into a plurality of regular volumes; c) disposing a first pressure sensor at a predetermined coordinate proximate the bottom surface of the container, with the pressure sensor producing an output related to detected fluid pressure at the predetermined coordinate; d) assigning to each of the volumes a corresponding volume location coordinate; e) numerically determining, for each of the regular volumes, a corresponding liquid mass value therein based on a relationship between the detected pressure at the predetermined coordinate and a calculated pressure at each of the volume location coordinates; and f) summing all of the numerically determined liquid mass values corresponding to the regular volumes to produce a total fluid mass for the container.

16 Claims, 2 Drawing Sheets

PRESSURE BASED FLUID GAUGING SYSTEM

BACKGROUND OF THE INVENTION

The invention relates generally to fluid gauging which involves the measurement of the mass and/or volume of fluid in a container. More specifically, the invention relates to the measurement and calculation of fluid volume and mass by numerical methods utilizing a number of pressure sensors disposed in the container.

Various fluid gauging techniques are well known and include the use of capacitive level sensors, ultrasonic level sensors and optical level sensors. Although pressure based fluid gauging has been discussed, as in, for example, U.S. Pat. Nos. 4,553,216; 4,739,494; and 5,138,559 the entire disclosures of which are fully incorporated herein by reference; such systems typically involve either numerous pressure sensors and/or a determination of the location of the liquid surface plane. Once the liquid surface plane is located, tank characterization data is used to determine the liquid volume and mass. Such known techniques tend to be rather complicated and may involve significant processor computations and extensive tank characterization data.

The objectives exist, therefore, to provide techniques for pressure based fluid gauging that are less complex and less costly to implement without loss of accuracy.

SUMMARY OF THE INVENTION

The present invention contemplates, in one embodiment, a method for gauging liquid in a container, the method comprising:

a) assigning a local three axis coordinate system for the container;

b) dividing the container into a plurality of regular volumes;

c) disposing a first pressure sensor at a predetermined coordinate proximate the bottom surface of the container, with said pressure sensor producing an output related to detected fluid pressure at said predetermined coordinate;

d) assigning to each of said volumes a corresponding volume location coordinate;

e) numerically determining, for each of said regular volumes, a corresponding liquid mass value therein based on a relationship between said detected pressure at said predetermined coordinate and a calculated pressure at each of said volume location coordinates; and f) summing all of said numerically determined liquid mass values corresponding to said regular volumes to produce a total fluid mass value for the container.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1:
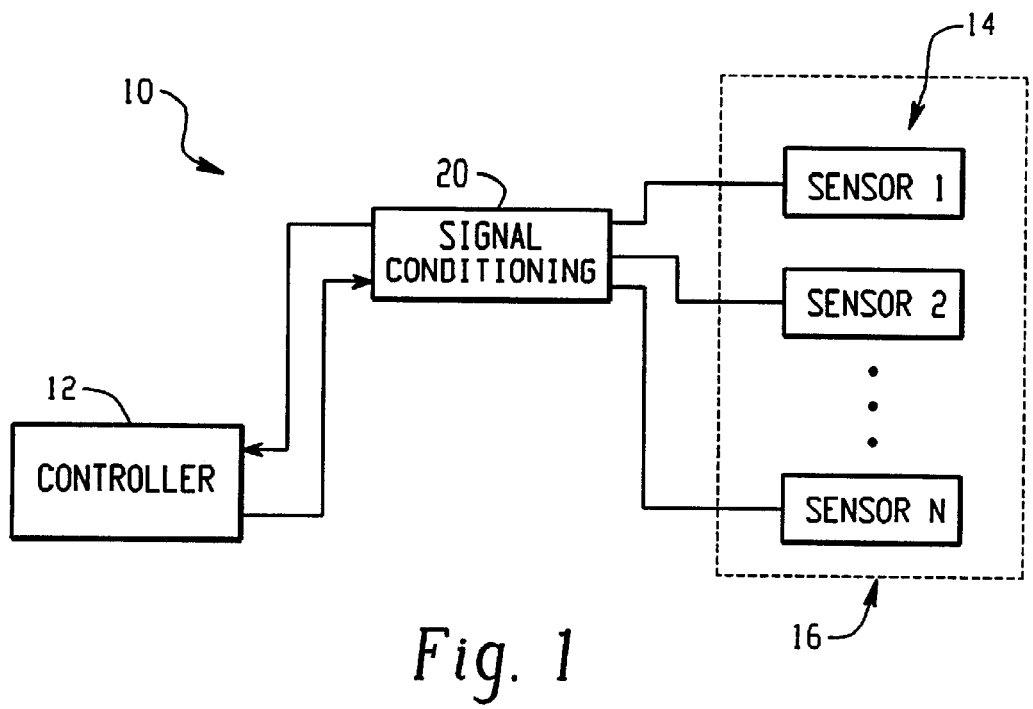
FIG. 1 is a functional block diagram of a fluid gauging system in accordance with the present invention.

With reference to FIG. 1, an embodiment of the invention is illustrated in simplified schematic form for purposes of describing the basic concepts of the invention. Although the invention is described herein with respect to fluid gauging for aircraft fuel tanks, such description is intended to be exemplary in nature. Those skilled in the art will appreciate that the invention can readily be applied to many different types of fluid gauging applications involving the determination of fluid quantity in a container.

In the basic configuration of FIG. 1, a fuel gauging system 10 includes a controller circuit 12, which can conveniently be realized in the form of a microprocessor-based system. However, the invention is not limited to the use of a microprocessor, but rather can be realized with any control circuit that implements the desired control functions and numeric calculations described herein, including digital and analog embodiments. The controller circuit 12 can be integral with or a separate system component of the overall aircraft fuel gauging and/or fuel management systems.

A plural number (N) of pressure sensors 14 are disposed inside a fuel tank, the latter being generally represented by the dashed box 16 in FIG. 1. Preferably, three or more ($N \geq 3$) pressure sensors are disposed along the bottom of the fuel tank, however, the invention can provide accurate fuel gauging operation with the use of as few as one pressure sensor 14. Although the present invention is not limited to a specific or required arrangement of the pressure sensors in the tank 16, it is preferred that the pressure sensors be so disposed so that at least one sensor is always covered with fuel (other than when the tank is empty), such as by being placed in the lowest part of the fuel tank 16. If the N sensors 14 are also to be used to determine the density of the fuel in the tank 16, then at least two sensors will need to be covered with fluid and vertically spaced apart by a known distance.

A signal conditioning circuit 20 is provided which operates as the interface between the sensors 14 and the controller circuit 12. The signal conditioning circuit 20 can be realized using any number of conventional designs as is well known to those skilled in the art. The present invention can generally be realized using conventional circuit designs and control techniques, such as described in the above-identified issued patents for example, and, therefore, a detailed description of the system hardware is not required to understand and practice the present invention. The present invention involves, rather, the way in which the sensor data is acquired and processed to provide accurate fuel gauging information.

Figure 2:
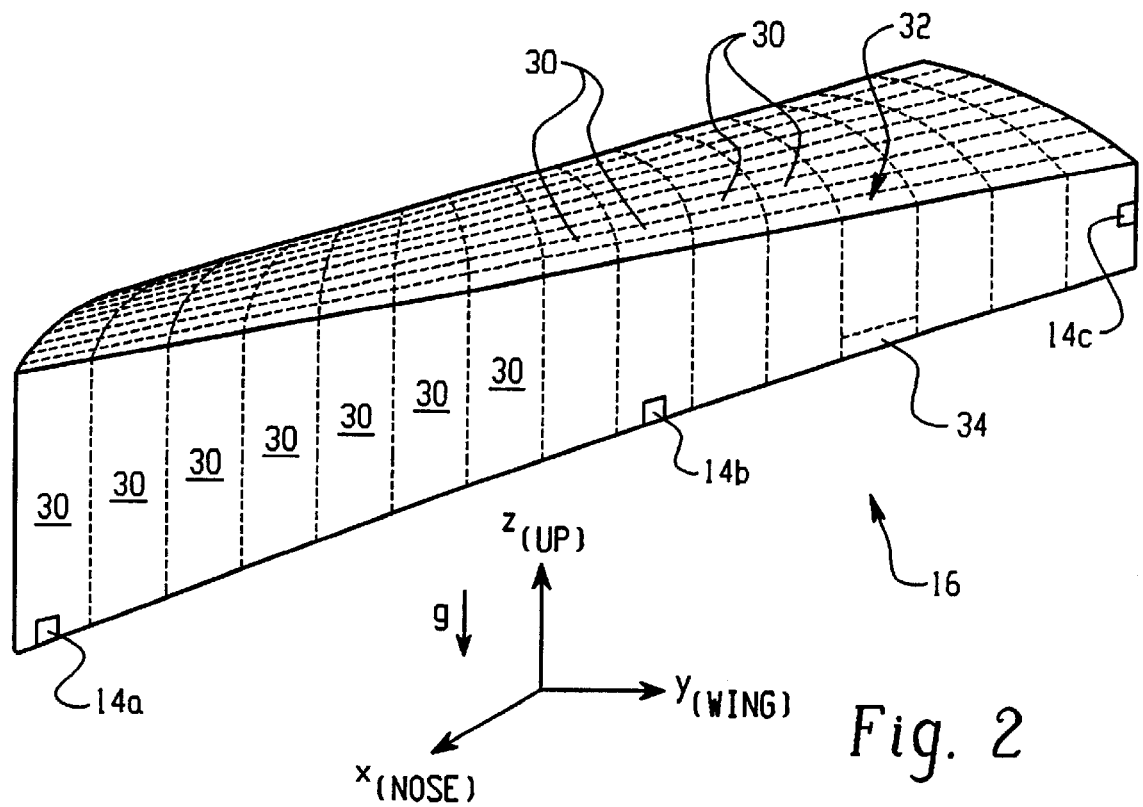
FIG. 2 is an exemplary graphical representation of a geometric construct used in one embodiment of the invention.

With reference to FIG. 2, illustrated is a geometric representation of a typical aircraft fuel tank 16. In accordance with the present invention, the tank 16 is "divided" into a plurality (j) of phantom regular columnar volumes 30. For clarity of the drawing, only a representative number of the volumes are identified with the reference numeral. The volumes 30 are referred to herein as "phantom" because the fuel tank is not physically subdivided as shown, but rather is subdivided for purposes of numerical calculation of the liquid mass in the tank 16. The number of volumes for any given tank geometry will depend in large measure on the structural complexity of the tank 16. In general, the volumes should be selected of such number so that the volume of liquid that corresponds to each column is uniform throughout the column and preferably has a uniform cross-sectional area along the entire length of the column. However, fuel tanks typically include structural elements such as baffles and piping, but these can be accounted for as described herein below.

Each columnar volume 30 can thus be defined by its location in the tank 16 relative to an arbitrarily selected origin. In one embodiment, the tank 16 is assigned a local three axis coordinate system in which the X axis is the roll axis, the Y axis is the pitch axis, and the Z axis is parallel to the gravity acceleration vector. Each column therefore lies generally parallel to the Z axis when the pitch and roll are both zero degrees. When gravity, g, is the only acceleration force acting on the tank 16, the gravity vector is normal to the surface of the liquid in the tank 16. This particular coordinate system is preferred but not required.

By dividing the tank 16 into the regular volumes 30 (by "regular" is meant that the cross-sectional area of the column is generally constant over the entire length of the column), each column can be numerically characterized by its XYZ coordinates relative to the origin. In the disclosed embodiment, the tank 16 is divided into one-hundred fifty (j=150) columns. For each column, the only information needed is the XYZ coordinates for the top centroid and bottom centroid of the column, and the cross-sectional area of the column. Each top centroid 32 (only one top centroid is identified in FIG. 2 for clarity of the drawing) is located in the geometric center of the top surface location of the column, and each bottom centroid 34 (again only a single bottom centroid is shown in FIG. 2) is located in the geometric center of the bottom surface location of the column. The bottom centroid therefore typically lies on the tank 16 bottom floor or wall. The height of the column is therefore simply the difference between the Z coordinates of the top centroid and bottom centroid. Cross-sectional area can be computed in any convenient manner for each column 30.

Aircraft fuel tanks are typically not simple structures, and may include various baffles, piping and so forth. These internal structures will affect the cross-sectional area of each column that intersects with such structures, but this can be conveniently accounted for in different ways. For example, a column with a pipe passing through it can by divided into several sections with an associated top and bottom centroid for each location. An alternative technique would be to simply subtract the volume of the column that is occupied by the inclusion once the numeric calculation indicates a fuel level above the inclusion. Either technique, as well as others apparent to those skilled in the art, can be accomplished in the numerical determination of the volume of fluid in each column.

FIG. 2 also illustrates in a representative manner the positioning of three pressure sensors 14a, 14b and 14c in the tank 16. These sensors 14 can be placed in any number of locations in the tank, with preferably at least one of the sensors (14a in the case of FIG. 2) being positioned in a lowermost region so as to always be covered by liquid (except under dry tank conditions). Although three sensors are shown in FIG. 2, more sensors can be used as needed, but the invention can also be realized with as few as one or two sensors.

In accordance with the invention, volume and mass of fluid in the tank 16 can be determined by determining the volume/mass of fluid in each of the columns 30 and then summing all the column values. Mass of fluid in each column is simply the volume times density ρ(Mass= Volume*Density or M=V*ρ). Depending on the number of sensors covered by fluid at the time of measurement, fluid density in each column can be either a calculated value or a default value-based on the last known measured value or even an estimated value based on a known fuel type and temperature. In a basic embodiment, density is assumed to be uniform throughout each column. However, density stratification can be accommodated if required for a particular application.

FIG. 2 illustrates in an exaggerated manner sensor 14c being disposed in the tank 16 a predetermined distance from sensor 14a along the Z axis. In practice the sensors 14a and 14c may be closely separated along the Z axis or substantially separated along the Z axis as required. When both sensors 14a and 14c are covered with fluids the difference in pressure readings between the two sensors, along with the known separation along the Z axis, provides a convenient way to measure the fluid density, by the relationship dP=ρgh where h is the separation of the two sensors along the Z axis and dP is the difference in pressure readings of the two sensors.

Density stratification can be detected in any convenient manner, including the use of two or more sensors disposed along the Z axis from top to bottom of the tank. Density stratification can also be determined based on detecting thermal gradients in the fluid using temperature sensors and known relationships between temperature and density for fuels and other liquids in the tank. However, in many applications, the use of pressure readings from two covered sensors 14 separated a known distance along the Z axis will provide sufficient accuracy for determining liquid density, volume and mass in the tank 16. Those skilled in the art will appreciate that the use of two sensors separated in height provides a measurement of the average fuel density between the sensors, and that this is superior to systems that base the density measurement on the measurement of a single density sensor at one point in the tank.

The volume/mass of fluid in each column is based on a numerical determination of the pressure in each column. Determining the pressure in each column can be accomplished in accordance with the invention by numeric techniques which utilize a pressure equation for the tank. The pressure equation used for any given measurement depends on the number of sensors 14 covered with fluid, and therefore may change during operation of the aircraft/fuel gauging system. Since there are, in the described embodiment, 150 phantom columns, the numeric techniques allow for accurate determination of fluid pressure in each column without having to use 150 sensors, and in fact being able to use as few as one sensor.

In the case where a single sensor 14 is covered with fluid so that there is only one pressure reading, the pressure equation is assumed to be linear and of the form:

$$P(XyZ)=C_1 * Z_{rot}+C_0 \qquad (1)$$

where: P(xyz) is the fluid pressure for a column located at coordinate xyz; coefficient $C_1$ is a constant and equals ρ*|a|; |a| is the magnitude of the acceleration vector; and $C_0$ is the pressure reading at the covered sensor 14 (and deemed to be at the origin of the local coordinate system). The value $Z_{rot}$ is the rotated components of the acceleration vector normal to the liquid surface, or Z(xyz)=x*cos(x)+y*cos(y)+z*cos(z); where cos(x), cos(y) and cos(z) are the direction cosines associated with the acceleration vector. The use of a rotated coordinate is needed since the orientation of the liquid surface relative to each column determines the effective cross-sectional area of each column, and also it is the acceleration component normal to the surface that is used for the pressure determination. The cosine values cos(x), cos(y) and cos(z), as well as the acceleration magnitude |a|, can be determined using a three axis accelerometer. The acceleration vector will be the net acceleration due to gravity and forces applied to the tank/aircraft such as from the engines, environment and so forth.

In the case of a single covered sensor, equation (1) above is calculated for each of the 150 columns by determining the value P(xyz) for the top centroid and bottom centroid of each column. The numerically determined pressure value for each bottom centroid is converted to mass using the known relationship $$Mass_i = Pressure_i * Area_i / [|a| * cos(z)] \quad (2)$$

for i=1–150.

Once the individual column masses ($Mass_i$) are determined, they can be summed to provide the total mass in the tank 16. Note that since only a single sensor is covered with fluid, the density value used will be based either on a separate density measurement or a default value based on the last known density measurement when two or more sensors were covered, or a density value based on temperature values or some other suitable technique.

Note that in the case where a column cross-sectional area ($area_i$ or $A_i$) is constant along the entire length of the column (no piping or other inclusions), the pressure equation (1) need only be calculated for the bottom centroid coordinate, because the cross-sectional area is a known quantity. If a column has inclusions, then the mass value for the column can be based on calculating the pressure values along the various sections of the column, for example. Or alternatively, for example, the volume/mass represented by the inclusion can be subtracted from the volume/mass calculation of the column.

Those skilled in the art will appreciate that fuel may entirely fill portions of a tank so that fluid hits the top wall of the tank, either during maneuvers or when the tank is near full. Thus, one or more columns may be filled with fluid, but the pressure may exceed a pressure value that would normally correspond with that quantity of fluid in the column. Therefore, in some applications, especially uses of the invention with closed fluid tanks or containers, it may be necessary also to numerically determine the column pressure at the top centroid and subtract it from the pressure value determined for the bottom centroid, in order to derive the actual column pressure values, Pressure $_i$ used in equation (2).

Additionally it should be noted that in all embodiments, the pressure readings from the covered sensors 14 used for the numerical determination of the pressure in each of the 150 columns must be the true pressure at the sensors 14, compensated for any ullage pressure in the tank 16. The ullage pressure can be accounted for either by the use of differential pressure sensors or by measuring the ullage pressure and subtracting it from the absolute pressure reading.

The pressure sensor readings can also be further compensated as needed for sensor accuracy (those skilled in the art will readily appreciate that pressure sensors exhibit a measurable error, usually expressed as a percent of full scale reading).

In the case where two sensors are covered with fluid, the pressure equation is again linear and still in the form of equation (1) above. If the two covered sensors are separated a known distance along the Z axis, however, then the two pressure readings can be used to determine the density value as described above. Thus, $C_1$ can be calculated from the following analysis of equation (1):

$$C_1 = [P_1 - P_2]/[cos(x)*(x_1-x_2) + cos(Y)*(Y_1-Y_2) + cos(z)*(Z_1-Z_2)]$$

where the subscripts 1 and 2 identify the data for the two sensors. The other unknown coefficient $C_0$ can then be calculated from equation (1) using the now known value of $C_1$ and either of the pressure sensor's data. Preferably, the pressure value is selected for the sensor 14 that represents the highest pressure of the covered sensors.

In the case where three or more sensors 14 are covered, the pressure equation can be significantly modified to account for different dynamic conditions in aircraft applications, for example, wing deflection can cause tank deflection which necessarily impacts the pressure readings taken by the sensors 14. The pressure equation (1) can be modified to take into consideration wing deflection:

$$P(xyz)C_1*Z_{rot} + C_2*R^2 + C_0 \quad (3)$$

where $C_1$, $C_0$, and $Z_{rot}$ are the same as previously defined herein above, and $C_2$ is the deflection coefficient and $$R^2 = x^2 + y^2 + Z^2 - (Z_{rot})^2 \quad (4)$$

Equation (4) assumes that the deflection root is at the origin of the XYZ coordinate system. If the deflection root is not at the origin of the local coordinate system, then the following calculation is made:

$$R^2 = (x-x_0)^2 + (y-y_0)^2 + (Z-Z_0)^2 - (Z_{rot})^2$$

where $x_0$, $y_0$ and $z_0$ define the deflection root.

Equation (3) is a non-linear equation with three unknowns ($C_0$, $C_1$ and $C_2$), therefore, at least three sensors 14 must be covered with fluid and producing valid pressure readings in order to solve equation (3) for the coefficients $C_1$ and $C_2$. Equation (3) can be solved by any number of conveniently available techniques including least squares fit approximation.

Another alternative is to use a commercially available program such as Mathematica™ or Mathcad™ to obtain a solution for the values of $C_1$ and $C_2$ with N equations in N unknowns, where N is the number of sensors 14 covered with fuel. Once the coefficients of the pressure equation are known, the pressure values for each of the regular volumes (columns) 30 can be numerically determined and the total mass and volume of fluid in the tank 16 can be calculated as described hereinbefore.

Least squares approximation and similar mathematical techniques can also be used to compensate the numerical pressure determinations for anomalies such as loss of a sensor or sensor 14 non-linear errors.

Those skilled in the art will further appreciate that equation (4) is not the necessary end of the pressure equation formulation. The pressure equation selected for any particular application may include other linear and/or non-linear elements in the equation to further refine the mass determination. For example, in some cases there will be a specific known relationship between the fuel tank deflection along the Y axis as a function of the deflection along the X axis. When such a relationship is known to exist then it can be included in the method of solution for the coefficients $C_1$ and $C_2$.

Figure 3:
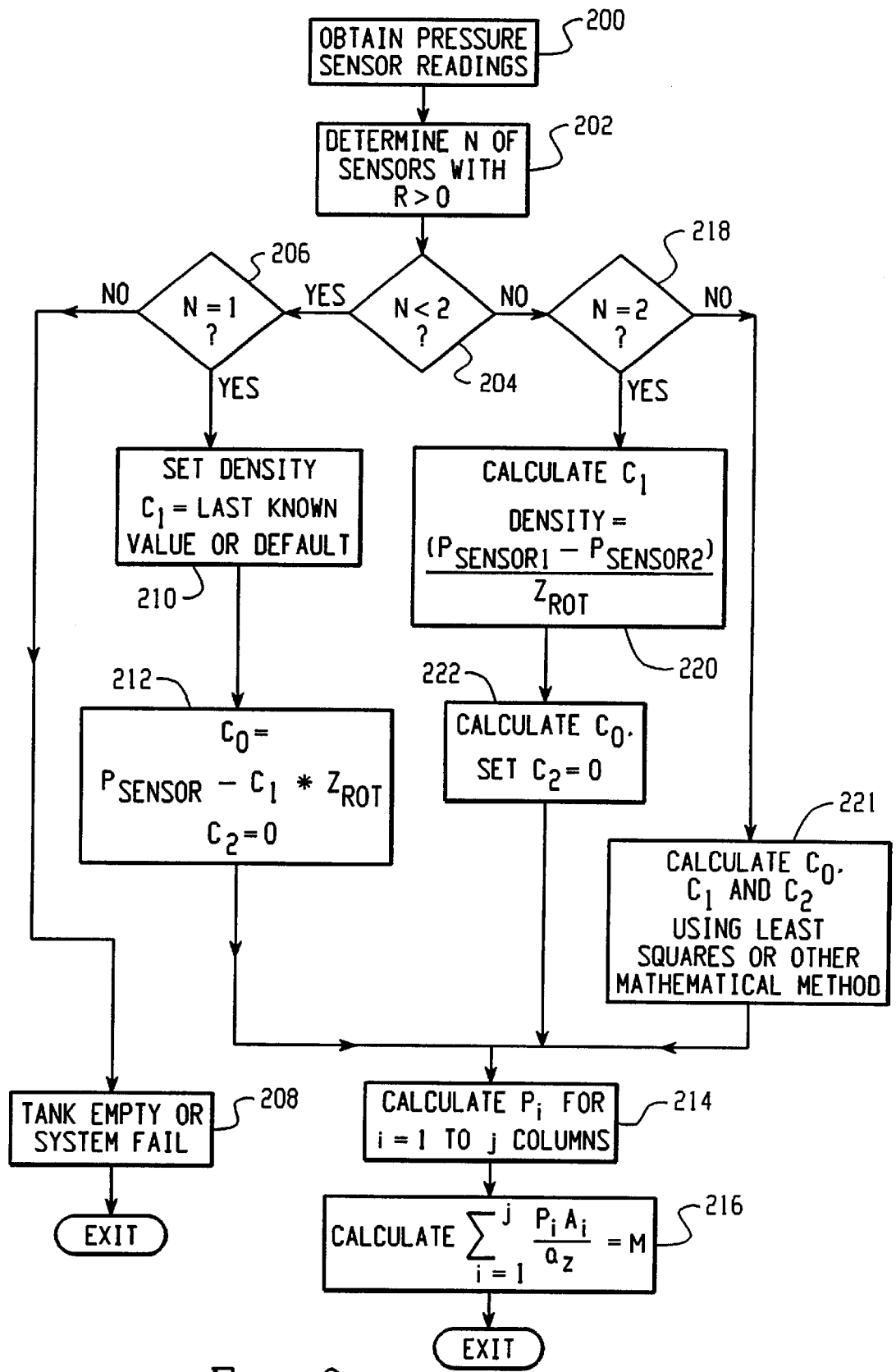
FIG. 3 is an exemplary control diagram for carrying out the present invention of pressure based fluid gauging.

FIG. 3 illustrates a suitable and exemplary control algorithm that can be conveniently realized in the software of the controller circuit 12 to carry out the present invention. In this embodiment, the system begins at step 200 with the controller circuit 12 acquiring the pressure sensor 14 readings via the conditioning circuit 20. In this embodiment it is assumed that the controller expects to obtain readings from at least three sensors 14.

At step 202 the controller 12 determines the number N of pressure sensors 14 that are sufficiently covered and/or operating to produce valid pressure data. At step 204, if N is less than 2, the program branches to step 206 and determines if N=1. If the result is negative (meaning that N=O, no sensors producing pressure data) then either the tank is empty, which can be independently verified, or there is a system failure which can be flagged at step 208 and the program exits.

If the result at step 206 is YES, then a single sensor is working, and pressure equation (1) applies. At step 210 the density value is selected as either a default value or the last known valid value and at step 212 the coefficient $C_0$ is known from the pressure reading of the single sensor, and $C_1$ is calculated as a constant based on the selected density value and the measured acceleration magnitude as described herein above. Coefficient $C_2$ is by definition zero since only one sensor is available. At step 214 the column pressure value $P_1$ (for i=1 to j, where j=150 in this embodiment) is numerically determined for each of the phantom columns 30 and at step 216 the total mass is determined as the sum of the individual column masses as set forth in equation (2) (where in FIG. 3, $a_z=|a|*\cos(z)$ or the acceleration component in the Z direction, which is normal to the liquid surface.

If the result at step 204 is negative, the program advances to step 218 and checks whether N=2. If the result is YES, at step 220 the value of $C_1$ can be calculated based on relationship $dP=\rho gh$ or $\rho=dP/gh$ as explained herein above. At step 222 the coefficient $C_0$ is calculated from equation (1) using the calculated value of $C_1$ and the pressure reading from preferably the lowest mounted pressure sensor 14 in the tank. Again, with only two sensors available, coefficient $C_2$ by definition equals zero ($C_2=0$) at step 222. The system then advances again to steps 214 and 216 and calculates the total mass/volume of fluid in the tank 16.

If the result is negative at step 218, then it is known that there are at least three pressure sensors 14 operational and covered with fluid in the tank 16. In this case the complete pressure equation such as equation (4) herein can be used to numerically determine the pressure in each of the j columns of fluid in the tank 16. At step 220 the coefficients $C_0$, $C_1$ and $C_2$ are determined, such as by a least squares fit as described herein above or other suitable technique, and then the program advances to steps 214 and 216 to calculate the total mass and volume as described herein.

A significant aspect of the present invention is that the total mass can be numerically determined with as few as one pressure sensor, and further without the use of memory and controller intensive tank characterization data for different tank orientations and acceleration regimes, such as would be required for pressure based fluid gauging techniques that determine the location of the liquid surface plane.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

What is claimed is:

1. A method of gauging liquid in a container, the method comprising:
    a) assigning a local three axis coordinate system for the container;
    b) dividing the container into a plurality of regular columnar volumes, each of said regular columnar volumes defined by a predetermined cross-sectional area that is not dependent individually on the geometry of the container;
    c) disposing a first pressure sensor at a predetermined coordinate proximate the bottom surface of the container, with said first pressure sensor producing an output related to detected fluid pressure at said predetermined coordinate;
    d) assigning to each of said regular columnar volumes a corresponding volume location coordinate;
    e) numerically determining, for each of said regular columnar volumes, a corresponding liquid mass value therein based on a relationship of said corresponding predetermined cross-sectional area and a calculated pressure at said volume location coordinate thereof based on said detected pressure at said predetermined coordinate; and
    f) summing all of said numerically determined liquid mass values corresponding to said regular columnar volumes to produce a total fluid mass value for the container.

2. The method of claim 1 wherein the container is subdivided into a plurality of small columns each aligned with an axis coincident with a predetermined acceleration axis.

3. The method of claim 2 wherein said predetermined acceleration axis coincides with the gravitational axis.

4. The method of claim 1 comprising the steps of determining a container acceleration component that is normal to the liquid surface, detecting pitch and roll rotations of the container, and using said acceleration, pitch and roll data for the numerical determination of pressure in each of said regular volumes.

5. The method of claim 1 wherein said relationship is generally defined by a linear pressure equation:

$$P(x,y,z)=C_1*Z+C_0$$

where:
    $P(x,y,z)$ is the calculated pressure at a regular volume located at a volume location coordinate (x,y,z);
    $C_1=(\rho*|a|)$ with $\rho$=density and $|a|$=acceleration magnitude normal to the liquid surface;
    Z=rotated coordinate for the regular volume at (x,y,z) based on container pitch, roll and an acceleration component normal to the liquid surface; and
    $C_0$ is the detected pressure at said sensor predetermined coordinate.

6. The method of claim 5 wherein density is an assigned value.

7. The method of claim 1 comprising the step of detecting fluid pressure at a second predetermined coordinate using a second pressure sensor that is spaced from said first pressure sensor relative to the liquid surface.

8. The method of claim 7 wherein density of the liquid in the container is calculated based on pressure data from said first and second sensors.

9. The method of claim 7 comprising the steps of detecting fluid pressure at a third predetermined coordinate using a third pressure sensor, and numerically determining a liquid mass value for each said regular volume based on a pressure equation defining 1) a linear relationship between pressure at each sensor and a calculated pressure for each regular volume, and 2) a second order relationship between pressure at each said regular volume and deflection of the container about a deflection axis.

10. The method of claim 9 wherein the pressure equation is:

$$P(x,y,z)=m_0*(Z)+m_1*(R^2)+P_0$$

where:
- P(x,y,z) is the calculated pressure at a regular volume located at a volume location coordinate (x,y,z);
- $m_0$ is a constant that defines a linear relationship between pressure at said sensor predetermined coordinates and pressure at each of said regular volumes;
- Z=rotated coordinate for the regular volume at (x,y,z) based on container pitch, roll and an acceleration component normal to the liquid surface;
- $m_1$ is a constant that defines a second order relationship between pressure at each of the sensor predetermined coordinates and a deflection value R;
- R is the location along the deflection axis where the container starts to bend; and
- $P_0$ is the detected pressure at a coordinate with Z=O and R=O.

11. The method of claim 10 wherein in the constants are calculated values based on the pressure sensor data.

12. A method for gauging liquid in a container, the method comprising:
a) assigning a local three axis coordinate system for the container;
b) dividing the container into a plurality of regular volumes;
c) disposing a first pressure sensor at a predetermined coordinate proximate the bottom surface of the container, with said first pressure sensor producing an output related to detected fluid pressure at said predetermined coordinate;
d) assigning to each of said regular volumes a corresponding volume location coordinate;
e) numerically determining, for each of said regular volumes, a corresponding liquid mass value therein based on a relationship between said detected pressure at said predetermined coordinate and a calculated pressure at each of said volume location coordinates, said relationship being generally defined by a linear pressure equation:

$$P(x,y,z)=C_1*Z+C_0$$

where:
- P (x,y,z) is the calculated pressure at a regular volume located at a volume location coordinate (x,y,z);
- $C_1=(\rho*|a|)$ with $\rho$=density and $|a|$=acceleration magnitude normal to the liquid surface;
- Z =rotated coordinate for the regular volume at (x,y,z) based on container pitch, roll andan acceleration component normal to the liquid surface; and
- $C_0$ is the detected pressure at said sensor predetermined coordinate; and f) summing all of said numerically determined liquid mass values corresponding to said regular volumes to produce a total fluid mass value for the container.

13. A method for gauging liquid in a container, the method comprising:
a) assigning a local three axis coordinate system for the container;
b) dividing the container into a plurality of regular volumes;
c) disposing at least three pressure sensors at at least three corresponding predetermined coordinates proximate the bottom surface of the container, with said at least three pressure sensors producing corresponding outputs related to detected fluid pressures at said at least three corresponding predetermined coordinates;
d) assigning to each of said regular volumes a corresponding volume location coordinate;
e) numerically determining, for each of said regular volumes, a corresponding liquid mass value therein based on a pressure equation defining: 1) a linear relationship between pressure at each sensor and a calculated pressure for each regular volume, and 2) a second order relationship between pressure at each said regular volume and deflection of the container about a deflection axis; and
f) summing all of said numerically determined liquid mass values corresponding to said regular volumes to produce a total fluid mass value for the container.

14. The method of claim 13 wherein density of the liquid in the container is calculated based on pressure data from at least two pressure sensors of the at least three pressure sensors.

15. The method of claim 13 wherein the pressure equation is:

$$P(x,y,z)=m_0*(Z)+m_1*(R^2)+P_0$$

where:
- P (x,y,z) is the calculated pressure at a regular volume located at a volume location coordinate (x,y,z);
- $m_0$ is a constant that defines a linear relationship between pressure at said sensor predetermined coordinates and pressure at each of said regular volumes;
- Z=rotated coordinate for the regular volume at (x,y,z) based on container pitch, roll and an acceleration component normal to the liquid surface;
- $m_1$ is a constant that defines a second order relationship between pressure at each of the sensor predetermined coordinates and a deflection value R;
- R is the location along the deflection axis where the container starts to bend; and
- $P_0$ is the detected pressure at a coordinate with Z=O and R=O.

16. The method of claim 15 wherein in the constants are calculated values based on the pressure sensor data.

* * * * *